US009729246B2

United States Patent
Ishizaka

(10) Patent No.: US 9,729,246 B2
(45) Date of Patent: Aug. 8, 2017

(54) MANUFACTURING METHOD FOR A PHASE MODULATION SYSTEM WITH ULTRAVIOLET DISCHARGE OF ACCUMULATED CHARGES

(71) Applicant: NEC Corporation, Tokyo (JP)

(72) Inventor: Masashige Ishizaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 72 days.

(21) Appl. No.: 14/388,628

(22) PCT Filed: Mar. 22, 2013

(86) PCT No.: PCT/JP2013/058438
§ 371 (c)(1),
(2) Date: Sep. 26, 2014

(87) PCT Pub. No.: WO2013/146620
PCT Pub. Date: Oct. 3, 2013

(65) Prior Publication Data
US 2015/0063801 A1    Mar. 5, 2015

(30) Foreign Application Priority Data
Mar. 30, 2012    (JP) ................................ 2012-079609

(51) Int. Cl.
*H04B 10/564*    (2013.01)
*G02F 1/225*    (2006.01)
(Continued)

(52) U.S. Cl.
CPC ......... *H04B 10/564* (2013.01); *G02F 1/2257* (2013.01); *H04B 10/25* (2013.01);
(Continued)

(58) Field of Classification Search
None
See application file for complete search history.

(56) References Cited

U.S. PATENT DOCUMENTS 5,963,358 A * 10/1999 Shields ................. B82Y 20/00
257/E31.032
6,882,760 B2 * 4/2005 Takabayashi ......... G02F 1/0136
359/489.08
(Continued)

FOREIGN PATENT DOCUMENTS

JP    1-230005    9/1989
JP    6-003710    1/1994
(Continued)

OTHER PUBLICATIONS

Machine translation of Japanese patent publication No. 2011242487 of Fujitsu published Dec. 1, 2011 (Fujitsu).*
(Continued)

*Primary Examiner* — Andrew Jordan
(74) *Attorney, Agent, or Firm* — Young & Thompson

(57) ABSTRACT

An optical functional device equivalent to a 2×2 Mach-Zehnder optical switch is produced by forming two 3 dB couplers and input/output waveguides on a substrate. Two optical phase modulation paths are formed on corresponding waveguides between 3 dB couplers. A channel region having an opposite electric polarity is formed between source and drain regions, having the predetermined electric polarity, formed on the substrate. The optical phase modulation path is insulated from the surrounding area and disposed above the channel region. Additionally, a control electrode (i.e. a gate region) subjected to high-density doping is formed above the optical phase modulation path. By applying an electric voltage having the predetermined polarity to the control electrode, the source region, and the drain region, it is possible to generate hot carriers, in proximity to the optical phase modulation path, so as to accumulate charges and change a refractive index, thus setting a desired lightwave input/output path.

16 Claims, 6 Drawing Sheets

(51) Int. Cl.
*H04B 10/25* (2013.01)
*H04B 10/548* (2013.01)
*H04Q 11/00* (2006.01)
*G02F 1/01* (2006.01)
*G02F 1/21* (2006.01)

(52) U.S. Cl.
CPC ....... *H04B 10/548* (2013.01); *H04Q 11/0005* (2013.01); *G02F 1/0121* (2013.01); *G02F 2001/212* (2013.01); *G02F 2203/055* (2013.01); *G02F 2203/15* (2013.01); *H04Q 2011/0035* (2013.01); *H04Q 2011/0039* (2013.01)

(56) References Cited

U.S. PATENT DOCUMENTS

| | | | | |
|---|---|---|---|---|
| 7,003,180 | B2* | 2/2006 | Richardson | G02F 1/3515 385/1 |
| 7,835,417 | B2* | 11/2010 | Heideman | H01S 5/065 372/20 |
| 8,676,017 | B2* | 3/2014 | Urino | G02F 1/025 385/131 |
| 8,699,830 | B2 | 4/2014 | Ezaki et al. | |
| 9,146,442 | B2* | 9/2015 | Hashimoto | G02F 1/035 |
| 9,239,484 | B2* | 1/2016 | Kuniyoshi | G02F 1/1368 |
| 2004/0101227 | A1* | 5/2004 | Takabayashi | G02F 1/0136 385/11 |
| 2004/0156572 | A1* | 8/2004 | Richardson | G02F 1/3515 385/1 |
| 2004/0245455 | A1* | 12/2004 | Reinhold | H01J 49/427 250/288 |
| 2009/0289934 | A1* | 11/2009 | Hirakawa | G09G 3/293 345/213 |
| 2010/0014544 | A1* | 1/2010 | Heideman | H01S 5/065 372/20 |
| 2011/0097030 | A1* | 4/2011 | Urino | G02F 1/025 385/3 |
| 2011/0141072 | A1* | 6/2011 | Makino | G09G 3/2927 345/204 |
| 2015/0063801 | A1* | 3/2015 | Ishizaka | G02F 1/2257 398/48 |

FOREIGN PATENT DOCUMENTS

| | | |
|---|---|---|
| JP | 06-232384 | 8/1994 |
| JP | 2005-520189 | 7/2005 |
| JP | 2005-536766 | 12/2005 |
| JP | 2011-186169 | 9/2011 |
| JP | 2011-242487 | 12/2011 |
| JP | 2012-53399 | 3/2012 |
| WO | WO 03/044590 | 5/2003 |
| WO | WO 03/077015 | 9/2003 |
| WO | WO 2009/157128 | 12/2009 |

OTHER PUBLICATIONS

International Search Report, PCT/JP2013/058438, Jun. 25, 2013.
Japanese Office Action dated Jan. 31, 2017 in corresponding Japanese Patent Application No. 2014-507838 with English translation of Japanese Office Action.

* cited by examiner (a)

(b)

MANUFACTURING METHOD FOR A PHASE MODULATION SYSTEM WITH ULTRAVIOLET DISCHARGE OF ACCUMULATED CHARGES

TECHNICAL FIELD

The present invention relates to an optical functional device, such as a wavelength tunable filter and a nonvolatile optical switch using an optical phase modulation element, and a manufacturing method thereof.

The present application claims priority on Japanese Patent Application No. 2012-79609 filed Mar. 30, 2012, the entire content of which is incorporated herein by reference.

BACKGROUND ART

Conventionally, silica-based planar light-wave circuits (PLC) have been developed for practical use, and therefore array waveguide gratings (AWG) and optical splitters have played a key role as key components supporting recent optical communication markets. Recently, optical functional devices such as wavelength tunable light sources hybrid-mounted on semiconductor optical amplifiers (SOA) and silica-based PLC have been developed to achieve an inexpensive small-size system on a single chip by mounting active elements and passive elements on the common PLC substrate. However, due to complex and advanced functions required for optical functional devices, it is necessary to increase the size of PLC elements and power consumption for driving PLC, which in turn causes limitations to functionality and performance achieved by conventional silica-based PLC. This expedites research and development for SOI (Silicon On Insulator) waveguides adapted to silicon fine processing technologies using thin silicon-wires and photonic crystals (PC), thus studying key components with small sizes, low power consumption, and low cost. In particular, it is possible to produce optical waveguides whose sizes are significantly reduced in comparison with the size of conventional PLC, by use of thin silicon-wires. It is possible to miniaturize SOI waveguides by use of micro-optical circuits, made of silicon core materials, with high relative refractive indexes to clad materials ($SiO_2$, dielectric). Compared with conventional silica-based optical waveguides with relative refractive indexes about 5% and bend radiuses of about 500 μm, thin silicon-wire optical waveguides can achieve relative refractive indexes of 40% or more and bend radiuses reduced to several microns. Using silicon materials, it is possible to produce optical elements serving as electrically active elements by way of integrated circuit technologies; hence, silicon materials have superior properties which cannot be realized in silica materials. Recently, small-size optical switches which can operate with low power consumption have been developed using silicon waveguides. However, it is necessary to increase power consumption used to hold control and operation of optical switches as optical-circuit paths become complex since it is necessary to hold optical-circuit paths applied to optical switches for several days or several months.

Recently, various technologies have been developed with respect to optical functional devices and optical waveguides. Patent Literature Document 1 discloses "Method and Apparatus for Phase-Shifting an Optical Beam in a Semiconductor Substrate", in which a plurality of floating charge modulated regions to shift phases of optical beams responsive to charge concentration is disposed along an optical path in a semiconductor substrate through which an optical beam is to be directed along an optical path. The optical function device includes a capacitor structure, used to accumulate charges in an optical waveguide, by which path switching is carried out using refraction variations due to variations of accumulated charges. This configuration does not need any power to hold charge storage; hence, it is possible to reduce standby power used to hold paths in an optical functional device. Patent Literature Document 2 discloses "Silicon Optical Waveguide Disposing MOS Capacitor on Waveguide". Herein, an electric field may change a free-carrier concentration of the uppermost layer or lower layers of a silicon optical waveguide; electric-field variations may cause variations of refractive indexes; then, refractive-index variations may cause variations of optical modes propagating through the silicon optical waveguide. It is possible to control optical-mode propagation by controlling electric-field variations. Patent Literature Document 3 discloses "Optical-Electronic Field Effect Transistor". The optical-electronic field effect transistor includes an optical waveguide below a gate electrode and a lower layer using a semiconductor layer with smaller refractive index than an active layer, thus confining light in an optical waveguide buried in an active layer. Variations of microwaves applied to a gate electrode may change a carrier concentration of an optical waveguide, thus changing a refractive index. It is possible to modulate the phase of an optical signal transmitting through an optical waveguide due to refractive-index variations of an optical waveguide. Patent Literature Document 4 discloses "Optical Modulator". The optical modulator includes an optical waveguide having a high-mesa waveguide structure in which optical confinement is achieved by clamping a core layer with a clad layer having a small refractive index, thus achieving optical phase modulation depending on an electric voltage applied to an optical waveguide.

CITATION LIST

Patent Literature Document

Patent Literature Document 1: Japanese Patent Publication No. 2005-536766
Patent Literature Document 2: Japanese Patent Publication No. 2005-520189
Patent Literature Document 3: Japanese Patent Application Publication No. H06-232384
Patent Literature Document 4: Japanese Patent Application Publication No. 2011-186169

SUMMARY OF INVENTION

Technical Problem

The configuration of Patent Literature Document 1 suffers from a problem in which an optical loss of an optical functional device may be significantly increased due to a large overlap area between an optical-mode field and a control electrode. It is necessary to continuously apply an electric voltage to the optical functional devices of Patent Literature Documents 2 and 3 in order to maintain variations of refractive indexes of optical waveguides.

It is necessary to use a thermo-optic effect or an electro-optic effect when producing optical functional devices such as optical switches and delay-variable elements in silicon optical waveguides. It is difficult to hold thermal diffusion without power when producing an optical functional device using an thermo-optic effect, and therefore it is necessary to prevent charge diffusion by use of an electro-optic effect which refers to as a carrier plasma effect due to charge storage. However, any methods of sufficiently reducing optical waveguide losses have not been developed with respect to structures of efficiently accumulating charges while preventing charge diffusion.

The present invention is created in consideration of the above problems. It is an object of the invention to provide an optical functional device having a novel structure which is able to hold predetermined paths without power while reducing an optical loss of an optical circuit. The present invention can efficiently accumulate, hold, and erase charges while sufficiently reducing an optical waveguide loss. The present invention can maintain a certain refractive index of an optical waveguide without continuously applying an electric voltage to an optical function device. It is possible to realize an optical functional device which can easily store, hold, and erase complex path setting and delay functions since the structure of the present invention can be produced by way of standard processes of large-scale integrated circuits.

Solution to Problem

The present invention is directed to an optical functional device serving as an optical switch including a substrate, a pair of input waveguides sequentially formed on the substrate, a pair of output waveguides, and a pair of 3 dB couplers. One 3 dB coupler is connected to a pair of input waveguides, while the other 3 dB coupler is connected to a pair of output waveguides, thus forming a pair of waveguides between a pair of 3 dB couplers. The optical functional device includes a pair of optical phase modulation paths formed on a pair of waveguides formed between a pair of 3 dB couplers; a pair of control electrodes formed above a pair of optical phase modulation paths; a source region formed below the edges of the paired optical phase modulation paths; a drain region formed below the intermediate parts of the paired optical phase modulation paths in proximity to the source region; and a pair of channel regions, having an electric polarity opposite to the electric polarity of the source region and the drain region, formed between the source region and the drain region. A pair of optical phase modulation paths is insulated from the surrounding area, while a pair of optical phase modulation paths is formed above a pair of channel regions.

In the above optical functional device, due to an electric voltage having the predetermined polarity applied to the control electrode, the source region, and the drain region, it is possible to generate hot carriers in proximity to a pair of optical phase modulation paths so as to accumulate charges and change a refractive index. By applying an electric voltage having an opposite polarity between the control electrode and the source region, it is possible to discharge the stored accumulated charges of the paired optical phase modulation paths so as to restore the refractive index in the original condition. Additionally, it is possible to efficiently accumulate charges in the optical phase modulation path or discharge the accumulated charges when excitation light from the outside is transmitted through the control electrode and irradiated to a pair of optical phase modulation paths.

The present invention is directed to an optical functional device serving as a wavelength tunable filter including a substrate; a plurality of input/output waveguides which is formed on the substrate and positioned oppositely to each other; a pair of stripe-shaped optical waveguides which is positioned in proximity to the opposite ends of the plural input/output waveguides; a ring-type optical waveguide interposed between a pair of stripe-shaped optical waveguides; a control electrode formed above the ring-type optical waveguide; a source region formed below one end of the ring-type optical waveguide; a drain region formed below the other end of the ring-type optical waveguide in proximity to the source region; and a channel region formed between the source region and the drain region. The ring-type optical waveguide is electrically floated from the surrounding area and formed above the channel region.

In the above optical functional device, due to the predetermined electric voltage applied between the source region and the drain region, it is possible to generate hot carriers so as to change the refractive index of the ring-type optical waveguide. By applying an electric voltage having an opposite polarity between the control electrode, the source region, and the drain region, it is possible to restore the refractive index of the ring-type optical waveguide in the original condition.

According to a manufacturing method of an optical functional device of the present invention, a substrate is formed by sequentially depositing a silicon substrate, a silicon oxide film, and a SOI layer; a pair of 3 dB couplers, a pair of input waveguides, and a pair of output waveguides are formed by processing the SOI layer; a pair of waveguides is formed between one 3 dB coupler connected to a pair of input waveguides and the other 3 dB coupler connected to a pair of output waveguides; a pair of optical phase modulation paths made of poly-silicon is formed on a pair of waveguides; a source region and a drain region each having the predetermined electric polarity are formed by doping the predetermined material into the SOI layer; a pair of channel regions having an opposite electric polarity is formed between the source region and the drain region below a pair of optical phase modulation paths; and a pair of control electrodes made of poly-silicon subjected to high-density doping is formed above a pair of optical phase modulation paths.

In the above manufacturing method of an optical functional device, due to an electric voltage having the predetermined polarity applied to the control electrode, the source region, and the drain region, it is possible to generate hot carriers in proximity to a pair of optical phase modulation paths so as to accumulate charges and change the refractive index, thus setting a desired light-wave input/output path. By applying an electric voltage having an opposite polarity between the control electrode and the source region, it is possible to discharge the accumulated charges of the paired optical phase modulation paths so as to restore the refractive index in the original condition, thus erasing the light-wave input/output path. Additionally, it is possible to efficiently accumulate charges in the optical phase modulation path or discharge the accumulated charges when excitation light from the outside is transmitted through the control electrode and irradiated to a pair of optical phase modulation paths.

Next, the operation of the optical functional device of the present invention will be described below. The optical functional device is configured of an optical waveguide (e.g. an optical phase modulation path) having the structure of an electric field effect transistor with a source region and a drain region used to inject charges into an electrically-floated floating waveguide core whose periphery is covered with an insulator (e.g. a silicon oxide film), wherein light-wave phase control is performed by changing the refractive index of the optical waveguide. During an operation of an electric field effect transistor, carriers such as electrons and holes moving from the source to the drain are accelerated due to a high electric field in proximity to the drain and thus turned into hot carriers having higher energy than thermal energy equivalent to the substrate temperature, and therefore hot carriers are transmitted through the insulator and injected into the floating waveguide core. The density of charges in the floating waveguide core is changed due to injection of hot carriers, while the refractive index of the floating waveguide core is changed due to a carrier plasma effect. It is possible to switch over the light-wave input/output path by use of an optical waveguide at a part of a 2×2 Mac-Zehnder optical switch. Charges injected into the floating waveguide core surrounded by the insulating barrier may not be dissipated and continuously accumulated for a long time. That is, it is possible to maintain variations of a refractive index without imparting additional energy to the optical waveguide. Additionally, it is possible to extract the accumulated charges due to a tunneling effect by appropriately applying an electric voltage between the drain and the control electrode disposed above the floating waveguide core, and therefore it is possible to restore the temporarily changed refractive index of the optical waveguide in the original condition. Thus, the optical functional device of the present invention is able to hold the light-wave input/output path being changed without power while restoring the light-wave input/output path in the original condition.

Advantageous Effects of Invention

The optical functional device of the present invention is designed to change a refractive index of an optical waveguide so as to switch over propagation paths of light-waves and control phase delays. In particular, the present invention aims to save power when holding phase-varied states. Specifically, the present invention demonstrates the following effects.

According to a first effect, it is possible to change a refractive index of an optical waveguide via electric control while holding the refractive-index changed state without power. Thus, the present invention can freely store and rewrite complex functions, including optical switches, wavelength tunable filters, and optical circuits, while significantly reducing standby power. According to a second effect, it is possible to produce the cross-sectional structure of an optical waveguide via similar manufacturing processes of transistors used in silicon integrated circuits (e.g. flash memory). Thus, it is possible to produce plenty of optical functional devices, according to the present invention, via mature processes of silicon integrated circuits with low cost. According to a third effect, it is possible to produce optical circuits, which can set and erase complex optical function control programs, with a high degree of integration via processes of silicon integrated circuits. According to a fourth effect, it is possible to design an optical function device using the structure of an electric field-effect transistor while achieving charge storage of an optical waveguide by use of hot-carrier injection due to impact ionization. Thus, it is possible to increase the distance between a control electrode (e.g. a gate electrode) and a floating waveguide core while reducing an optical propagation loss due to a reduction of light-wave effusion into a control electrode.

DESCRIPTION OF EMBODIMENTS

The optical functional element and the manufacturing method thereof according to the present invention will be described by way of examples with reference to the accompanying drawings.

First Embodiment

Figure 1:
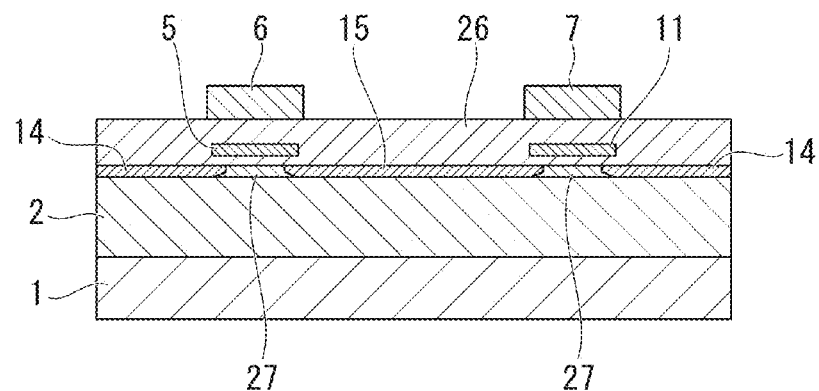
FIG. 1 is a cross-sectional view taken along line A-B in FIG. 3, showing an optical functional device serving as an optical switch according to a first embodiment of the present invention.
Figure 2:
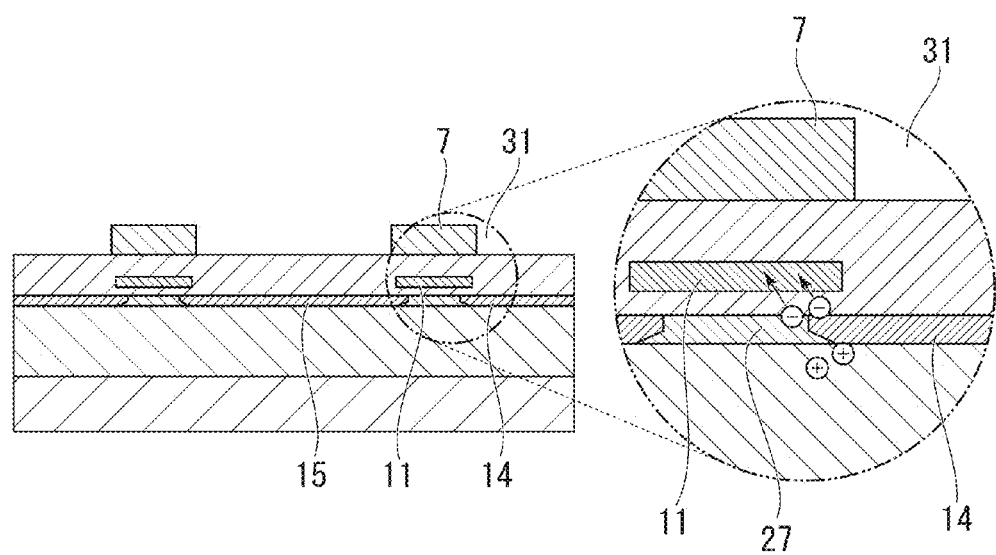
FIG. 2 is a partially enlarged cross-sectional view of FIG. 1.
Figure 3:
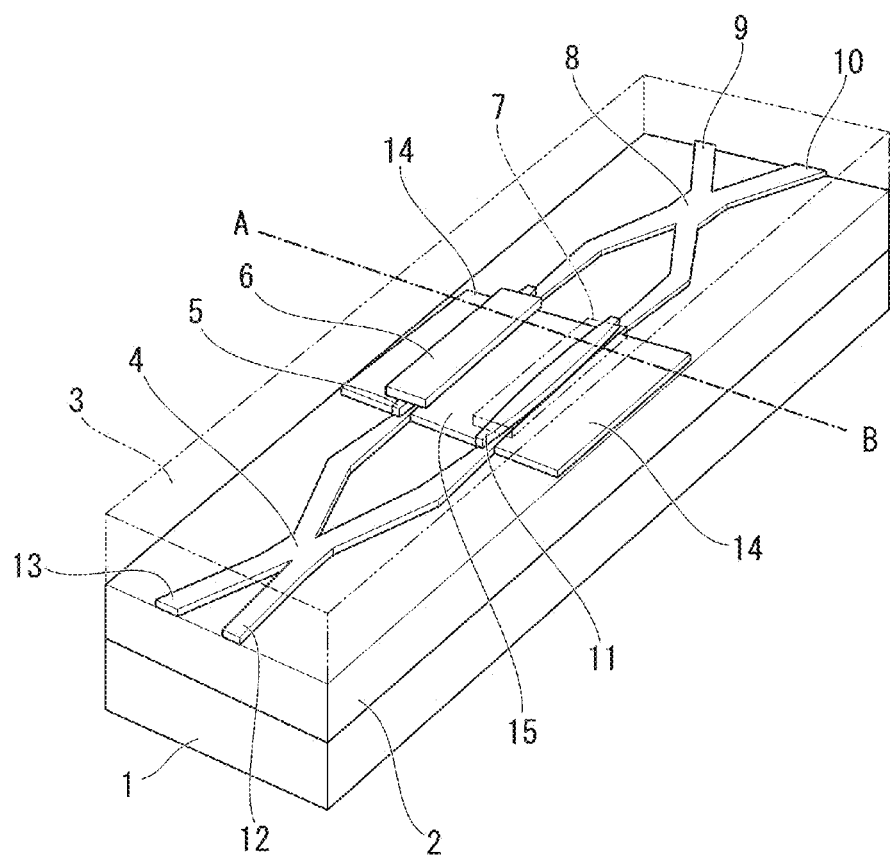
FIG. 3 is a perspective view of the optical switch shown in FIGS. 1 and 2.

The optical functional device serving as an optical switch according to the first embodiment of the present invention will be described in detail with reference to FIGS. 1 to 3 and FIGS. 6 to 8. FIG. 3 is a perspective view of the optical switch, while FIGS. 1 and 2 are cross-sectional views taken along line A-B in FIG. 3. FIG. 2 is a partially enlarged cross-sectional view of FIG. 1.

In the present invention, a substrate is produced by sequentially forming a buried silicon oxide film 2 and an SOI (Silicon On Insulator) layer on a silicon substrate 1. By appropriately processing the SOI layer in the substrate, it is possible to form a 2×2 Mach-Zehnder optical switch including 3 dB MMI (Multi Mode Interference) couplers 4, 8, input waveguides 12, 13, and output waveguides 9, 10. A pair of poly-silicon waveguides (or optical phase modulation paths) used to accumulate charges is formed on a pair of waveguides interposed between the MMI couplers 4 and 8, while a pair of poly-silicon control electrodes (or gate regions) 6, 7 which is subjected to high-density doping to achieve the predetermined electric polarity is formed as well. A source region 14 and a drain region 15 which are subjected to doping to achieve the predetermined electric polarity are formed in the SOI layer below the waveguides 5, 11. Additionally, an upper clad layer 3 made of the silicon oxide film 2 is deposited on the top portion of a silicon layer which is formed by processing the SOI layer.

In FIG. 1, channel regions 27 whose electric polarity is opposite to the electric polarity of the source region 14 and the drain region 15 are formed between the source region 14 and the drain region 15 which are formed using part of the SOI layer formed on the silicon substrate 1. The waveguides 5, 11 used to accumulate charges are formed on the channel regions 27 such that the peripheries thereof are surrounded by the silicon oxide film 2. Additionally, the poly-silicon control electrodes 6, 7 subjected to high-density doping are formed on the waveguides 5, 11.

Figure 8:
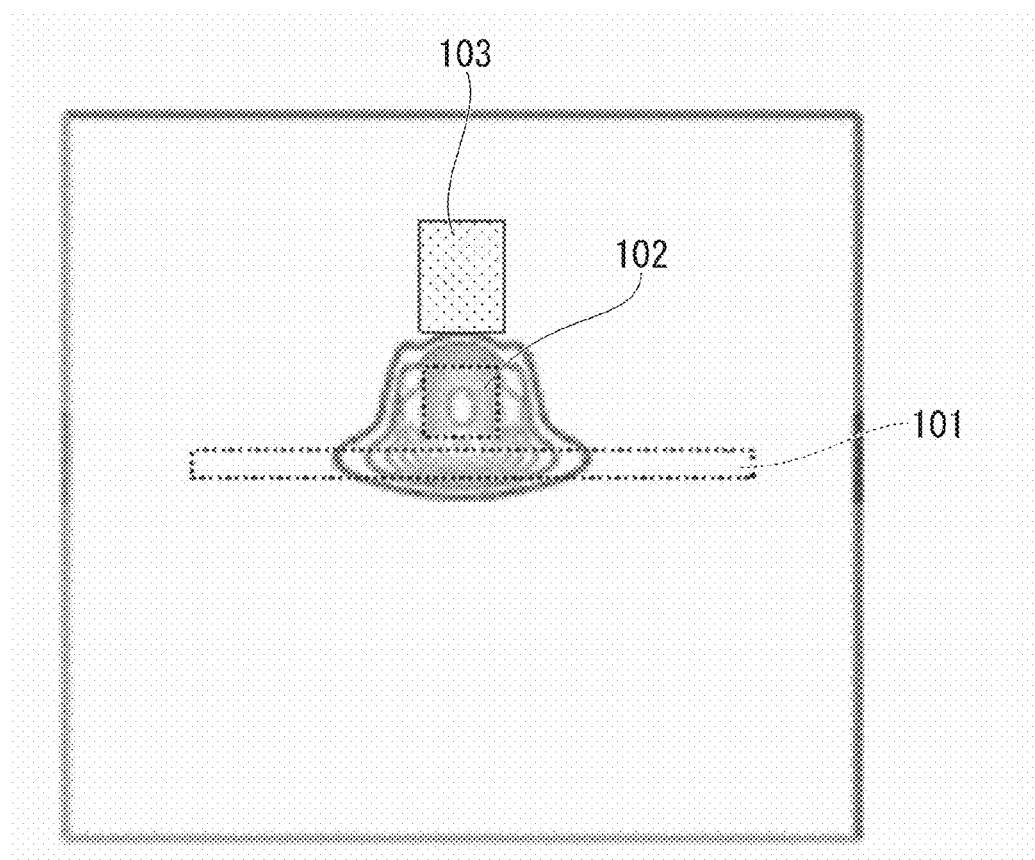
FIG. 8 is a schematic of the result of electric-field distribution simulation in a waveguide structure including an SOI layer, a floating waveguide core, and a control electrode.

Since the waveguides 5, 11 are formed in proximity to each other above a pair of channel regions 27 and optically connected together, a mode field shown in FIG. 8 is formed between them. Due to variations of refractive indexes of the waveguides 5, 11 depending on the presence or absence of charges accumulated therein, the phases of light-waves propagating through the waveguides 5, 11 are correspondingly changed. The waveguides 5, 11 are insulated from the outside via the clad layer 26 serving as an insulator which is formed by processing the SOI layer. For example, the source region 14 and the drain region 15 are formed by doping materials of arsenic, phosphorus, and boron into the SOI layer at a density of $10^{18}$ to $10^{20}$ molecule number/cm$^3$. In the present embodiment, a single drain region 15 is formed between the source regions 14 on both sides thereof. That is, the waveguides 5, 11 are formed such that the cross-sectional shapes thereof perpendicular to the optical-waveguide direction are formed in flat shapes, while the control electrodes 6, 7 are disposed opposite to the upper facets of the waveguides 5, 11. The source region 14 is disposed proximately to one side of the lower facets of the waveguides 5, 11, while the drain region 15 is disposed in proximate to the other side of the lower facets of the waveguides 5, 11. As described above, the channel regions 27 having the opposite electric polarity are formed between the source region 14 and the drain region 15, while the waveguides 5, 11 are disposed above the channel regions 27. Additionally, the peripheries of the waveguides 5, 11 are surrounded by the silicon oxide film 2 and insulated from the outside. In this connection, the silicon oxide film 2 has a lower refractive index than the refractive indexes of the waveguides 5, 11.

Next, the function of the optical switch of the present embodiment will be described with reference to FIG. 2 and FIGS. 6 to 8. FIG. 2 is a partially enlarged view of the cross-sectional view of FIG. 1, showing charges being accumulated in the waveguide 11. When an electric voltage is applied between the source region 14 and the drain region 15 while an electric voltage is applied between the source region 14 and the control electrode 7, a plurality of carriers flowing from the source region 14 to the drain region 15 is accelerated at the position proximate to the drain region 15 in an enlarged area 31 of FIG. 2, thus generating hot carriers having higher energy than the thermal energy of the substrate (i.e. the silicon substrate 1, the silicon oxide film 2, and the SOI layer) due to impact ionization. Hot carriers passing through the silicon oxide film 2 are injected into the poly-silicon waveguide 11. Injecting hot carriers may increase the density of carriers in the poly-silicon waveguide 11 so as to change the refractive index thereof. Since the periphery of the poly-silicon waveguide 11 is surrounded by an insulator and therefore in an electrically floating condition, it is possible to hold the accumulated charges for a long time, and it is possible to hold refractive-index variations for a long time without additional power.

When an electric voltage having the polarity opposite to the polarity of accumulated charges is applied between the source region 14 and the control electrode 7, it is possible to extract charges accumulated in the poly-silicon waveguide 11 due to a tunneling effect. Thus, it is possible to restore the poly-silicon waveguide 11, whose refractive index is changed due to injection of hot carriers, in the original condition. It is possible for the 2×2 optical switch of the present embodiment to switch over paths by changing the refractive indexes of the waveguides 5, 11, wherein it is possible to hold the temporal setting of paths without power due to the foregoing function. Additionally, it is possible to restore the path setting of the optical switch in the original condition via electric control.

Owing to the poly-silicon waveguide (or the optical phase modulation path), which is insulated from the surrounding area via the silicon oxide film 2 having an insulating property and which is able to accumulate charges, it is possible to maintain the path setting, which can be switched over as described above, without continuously applying power. Additionally, it is possible to restore the path setting of the optical switch in the original condition via electric control. In this case, when an electric voltage having the polarity opposite to the polarity of charges accumulated in the poly-silicon waveguide 11 is applied between the source region 14 and the control electrode 7, it is possible to extract charges accumulated in the poly-silicon waveguide 11 due to a tunneling effect.

Figure 6:
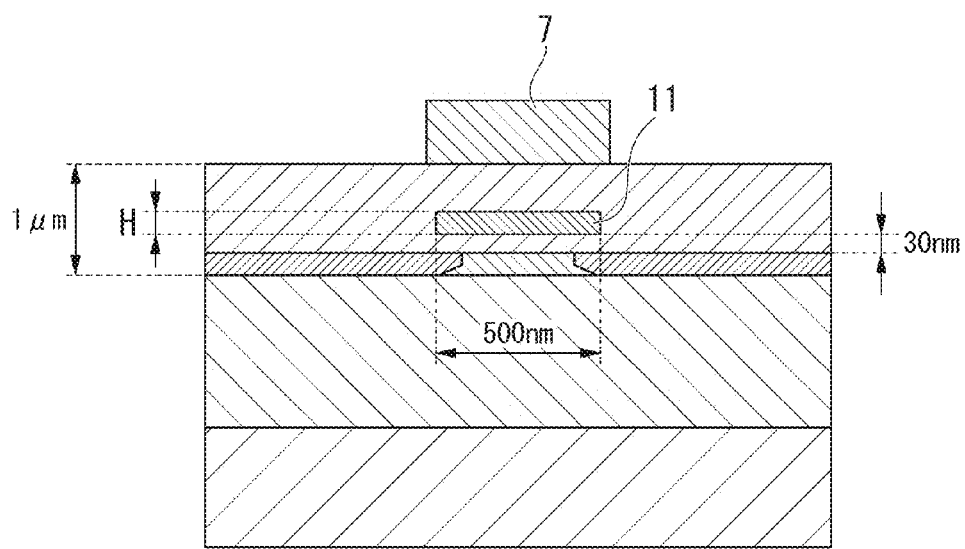
FIG. 6 is an enlarged cross-sectional view schematically showing a waveguide structure of an optical phase modulation region in the optical switch shown in FIGS. 1 and 2.
Figure 7:
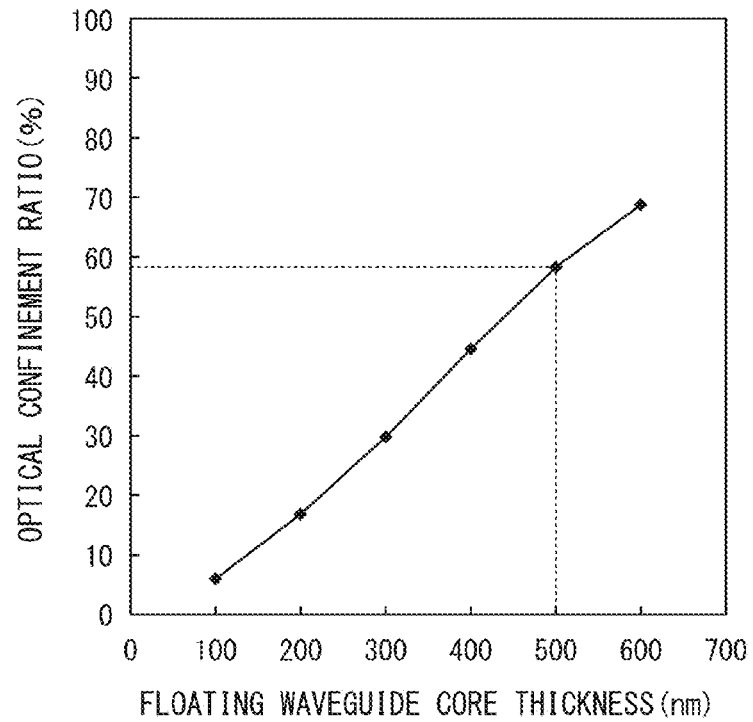
FIG. 7($a$) is a graph showing an optical confinement ratio relative to a core thickness H of a floating waveguide, while FIG. 7($b$) is a graph showing a light-wave effusion ratio into a control electrode relative to a core thickness H of a floating waveguide.
Figure 7:
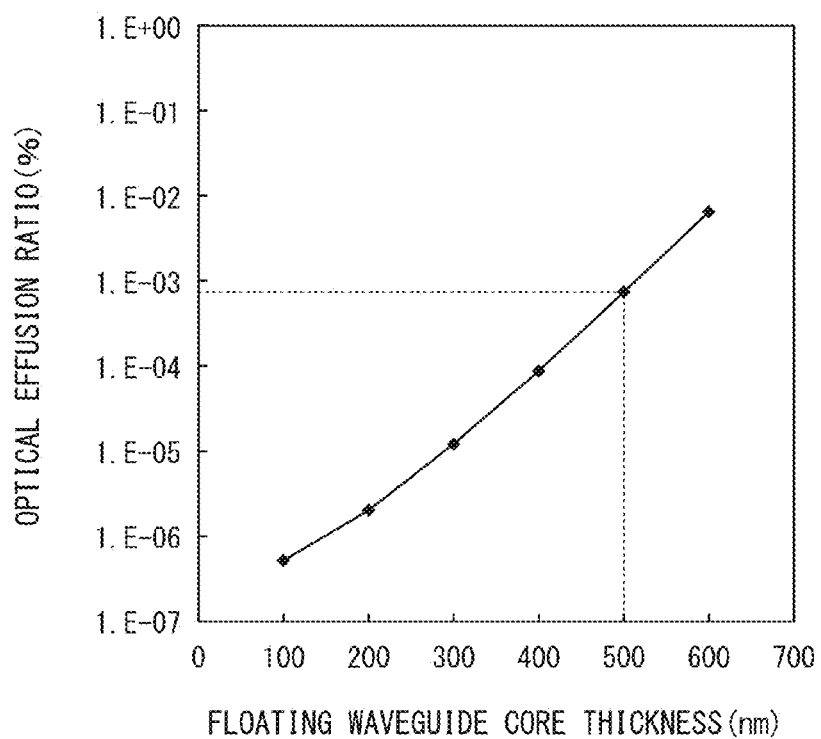

The optical switch having the aforementioned waveguide structure is characterized in that it is possible to efficiently change the optical phase with reducing a light-wave propagation loss. FIG. 6 is an enlarged cross-sectional view schematically showing the waveguide structure of the optical phase modulation region of the optical switch shown in FIGS. 1 and 2. Herein, the distance between the lower face of the SOI layer and the control electrode 7 is set to 1 μm, while the core thickness of a floating waveguide (i.e. the poly-silicon waveguide 11) used to accumulate charges is set to 500 nm. Additionally, the distance between the upper face of the SOI layer and the floating waveguide is set to 30 nm, while the core thickness of the floating waveguide is set to H. FIGS. 7(a), (b) show the results of simulation using a parameter representing the core thickness H of the flowing waveguide in the waveguide structure of FIG. 6. FIG. 7(a) shows a ratio of intensity of light-waves, confined in the floating waveguide, to the core thickness H of the floating waveguide (i.e. an optical confinement ratio), while FIG. 7(b) shows a ratio of intensity of light-waves, effused into the control electrode 7, to the core thickness H of the floating waveguide (i.e. an optical effusion ratio). Using the core thickness H of the floating waveguide equal to 500 nm, it is possible to achieve an optical confinement ratio of 50% or more, while it is possible to reduce an optical effusion ratio to 0.001% or less with respect to light-waves effused into the control electrode 7. FIG. 8 is a schematic of the result of electric-field distribution simulation with respect to the waveguide structure including a SOI layer 101, a floating waveguide core 102, and a control electrode 103. Herein, an electric field distribution is focused on the floating waveguide core 102, while substantially no light-wave effusion is found in the control electrode 103. That is, the waveguide structure of the present embodiment can produce an adequate light-wave distribution in the refractive-index modulation region (i.e. the optical phase modulation region) while reducing light-wave effusion serving as a main factor of an optical absorption loss, thus realizing an optical functional device having a small waveguide loss.

The optical switch of the present embodiment can be produced using a SOI substrate via the existing semiconductor manufacturing technology. This eliminates the necessity of installing special facilities in manufacturing optical switches according to the present embodiment. Additionally, it is possible to produce the optical switch of the present embodiment by use of a bulk substrate made of insulating ceramics or polymer without using any SOI substrates.

As described above, the optical switch of the present embodiment can accumulate charges in such a way that an electric voltage applied between the source region 14, the drain region 15, and the control electrode 7 may generate hot carriers, which are then injected into the waveguides (i.e. optical phase modulation paths) 5, 11. Additionally, an electric voltage applied between the source region 14 and the control electrode 7 may discharge electric charged accumulated in the waveguides 5, 11. Thus, it is possible to change the optical phase modulation condition of the waveguides 5, 11 insulated from the surrounding area by simply applying an electric voltage.

The control electrode 7 may be formed in a mesh structure forming a plurality of through-holes transmitting excitation light such as ultraviolet rays therethrough, or the control electrode 7 may be formed as a transparent electrode transmitting excitation light. Thus, the control electrode 7 can transmit excitation light, irradiated from the outside, through the waveguides 5, 11. In this case, when excitation light passing through the control electrode 7 is irradiated to the waveguides 5, 11 while an electric voltage is applied between the source region 14, the drain region 15, and the control electrode 7, it is possible to highly-efficiently inject hot carriers into the waveguides 5, 11 due to excitation light, thus accumulating charges. Additionally, it is possible to discharge the accumulated charges by irradiating excitation light, passing through the control electrode 7, to the waveguides 5, 11. In this case, it is possible to easily discharge charges accumulated in the waveguides 5, 11 without applying an electric voltage between the source region 14, the drain region 15, and the control electrode 7. Moreover, when excitation light passing through the control electrode 7 is irradiated to the waveguides 5, 11 while an electric voltage is applied between the source region 14 and the control electrode 7, it is possible to highly-efficiently discharge the accumulated charges.

In the present embodiment, the waveguides (i.e. optical phase modulation paths) 5, 11 are made of poly-silicon; but this is illustrative and not restrictive. For example, it is possible to form the waveguides 5, 11 by use of a plurality of silicon oxide films and a plurality of silicon nitride films which are deposited in a multilayered manner. In this case, it is possible to adjust the refractive indexes of the waveguides 5, 11 to desired values.

Second Embodiment

Figure 4:
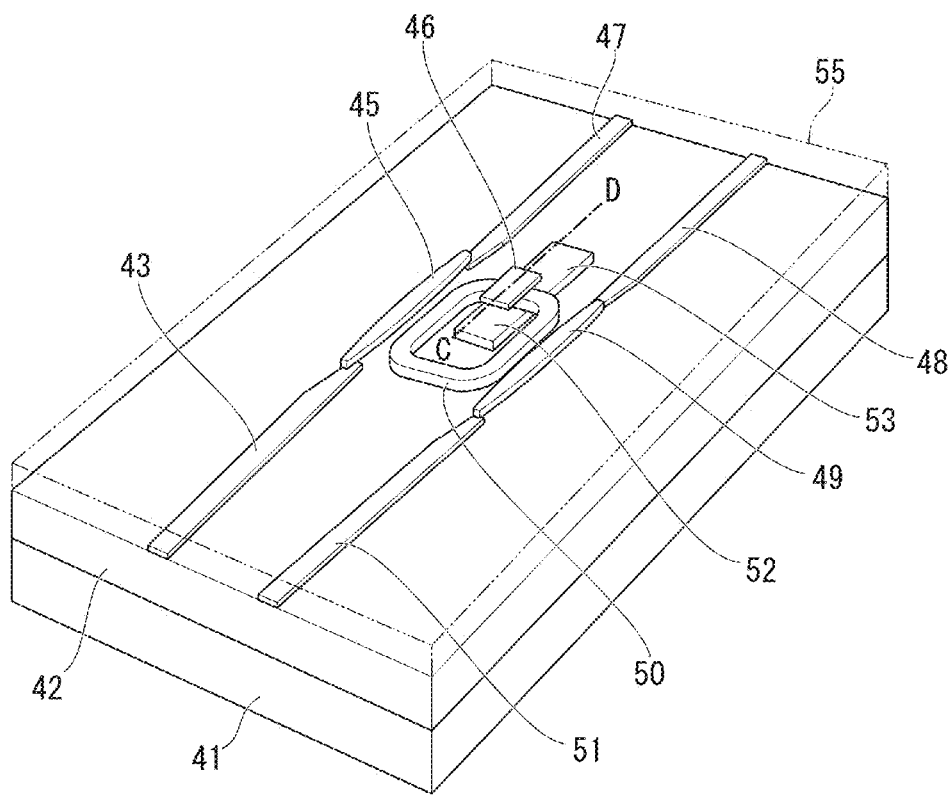
FIG. 4 is a perspective view of an optical functional device serving as a ring-type wavelength tunable filter according to a second embodiment of the present invention.

Next, a ring-type wavelength tunable filter serving as an optical functional device according to the second embodiment of the present invention will be described with reference FIGS. 4 and 5. The ring-type wavelength tunable filter includes an electrically-floated waveguide (i.e. a floating waveguide), which is able to accumulate electric charges, at part of a ring-type optical waveguide (or a ring-type wavelength filter). FIG. 4 is a perspective view of the ring-type wavelength tunable filter, while FIG. 5 is a cross-sectional view taken along line C-D in FIG. 4.

A substrate is produced by sequentially forming a buried silicon oxide film 42 and a SOI layer on a silicon substrate 41. By appropriately processing the SOI layer in the substrate, it is possible to form input/output waveguides 43, 47, 48, 51 as well as a source region 52 and a drain region 53. Impurities are doped into the substrate such that the source region 52 and the drain region 53 will have predetermined electric polarities. An upper clad layer 55 made of the silicon oxide film 42 is deposited on the top portion of a silicon layer which is formed by processing the SOI layer, and then a ring-type optical waveguide 50 made of poly-silicon is formed thereon. A pair of stripe-shaped optical waveguides 45, 49 is disposed oppositely to each other in proximity to the ring-type optical waveguide 50. The tips of the input/output waveguides 43, 47, 48, 51, which are formed by processing the SOI layer, are disposed proximately to each other and optically connected to the lower parts of the tips of the stripe-shaped optical waveguides 45, 49. The ring-type optical waveguide 50 is covered with the upper clad layer 55. A control electrode 46 made of poly-silicon, which is formed by doping impurities at a high density on the upper clad layer 55, is disposed above the ring-type optical waveguide 50.

Figure 5:
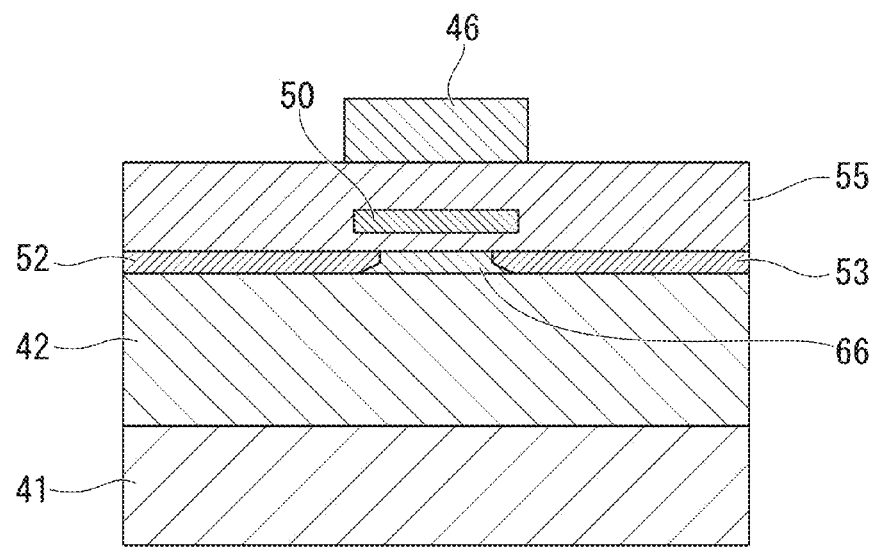
FIG. 5 is a cross-sectional view taken along line C-D in FIG. 4.

FIG. 5 shows the cross-sectional structure of the ring-type wavelength tunable filter including the control electrode 46 and the ring-type optical waveguide 50. The buried silicon oxide film 42 is formed on the silicon substrate 41, while the source region 52 and the drain region 53 are further formed thereon by doping impurities into the SOI layer. A channel region 66 is formed between the source region 52 and the drain region 53, while the ring-type optical waveguide 50, which is electrically floated via the lower part of the upper clad layer 55, is formed above the channel region 66. Additionally, the control electrode 6 is disposed above the ring-type optical waveguide 50 via the upper part of the upper clad layer 55. A ring resonator is formed using the ring-type optical waveguide 50 and the stripe-shaped optical waveguides 45, 49.

Next, the function of the ring-type wavelength tunable filter shown in FIGS. 4 and 5 will be described below. Due to an electric voltage applied between the source region 52 and the drain region 53, hot carriers occur via impact ionization of carriers accelerated in proximity to the drain region 53. Hot carriers are injected into the ring-type optical waveguide (i.e. a floating optical waveguide) 50, thus changing the refractive index. Due to a refractive-index variation of the ring-type optical waveguide 50, the ring resonator (i.e. the optical waveguides 45, 49, 50) is changed in terms of the resonance wavelength, and therefore the structure shown in FIGS. 4 and 5 operates as a ring-type wavelength tunable filter. By electrically driving the structure, it is possible to change the output path of a light-wave having a specific wavelength, among light-waves incident on the input/output waveguides 43, from the input/output waveguide 47 to the input/output waveguide 51, and therefore it is possible to hold the changed state without power. By applying an electric voltage between the source region 52, the drain region 53, and the control electrode 46, it is possible to restore the temporarily changed light-wave output path in the original condition.

The technical features of the present invention are not necessarily limited to Mach-Zehnder optical switches (i.e. the first embodiment) and ring-type wavelength tunable filters (i.e. the second embodiment) but applicable to various types of optical devices. For example, it is possible to design a directional coupler including a pair of a first optical waveguide and a second optical waveguide, each having a pair of an external input terminal inputting light-waves and an external output terminal outputting light-waves, with optical phase modulation paths which are formed in the first and second optical waveguides and optically connected to each other. In the directional coupler, the optical phase modulation path is insulated from the surrounding area and configured to hold electric charges accumulated therein. Thus, it is possible to adjust a branch ratio of light-waves propagating through the optical phase modulation path by changing the phase of the optical phase modulation path. In the directional coupler in which the optical phase modulation path can maintain the presence or absence of accumulated charges, it is possible to maintain a branch ratio of light-waves being adjusted without needing continuously applying of an electric voltage.

Additionally, it is possible to design an optical matrix circuit including a plurality of optical functional devices, each having a pair of external input terminals and a pair of external output terminals, in which the external output terminal of one optical functional device is optically connected to the external input terminal of the other optical functional device. It is possible for the optical matrix circuit to achieve multi-input/multi-output optical path setting by appropriately setting the presence or absence of charges accumulated in the optical phase modulation path in the optical functional device. It is possible to maintain the optical path setting without continuously applying an electric voltage.

Lastly, the present invention is not necessarily limited to the first and second embodiments as well as the above variations; hence, it is possible to implement various design changes and modifications within the scope of the invention defined by the appended claims.

INDUSTRIAL APPLICABILITY

The present invention is able to maintain the input/output path setting of light-waves in the structure including optical waveguides and optical phase modulation paths without voltage, and the present invention is applicable to various types of optical functional devices such as optical switches, optical delay circuits, and optical filters, thus holding desired phase variations or erasing phase variations.

REFERENCE SIGNS LIST 1 silicon substrate
2 buried silicon oxide film
3 upper clad layer
4, 8 3 dB MMI coupler
5, 11 waveguide (optical phase modulation path)
6, 7 control electrode (gate region)
9, 10 output waveguide
12, 13 input waveguide
14 source region
15 drain region
27 channel region
31 enlarged area
41 silicon substrate
42 buried silicon oxide film
43, 47, 48, 51 input/output waveguide
45, 49 stripe-shaped optical waveguide
46 control electrode (gate region)
50 ring-type optical waveguide
52 source region
53 drain region
55 upper clad layer
66 channel region
101 SOI layer
102 floating waveguide core
103 control electrode

The invention claimed is:

1. A drive method for switching and setting a phase of a light-wave being guided by an optical phase modulation device,
the optical phase modulation device comprising:
an optical phase modulation path having a first refractive index that is capable of being changed depending on charges accumulated therein, the optical phase modulation path having a flat cross-sectional shape perpendicular to a light-wave waveguide direction, and configured to change a phase of a light-wave;
an insulating part having a second refractive index that is lower than the first refractive index, the insulating part configured to insulate the optical phase modulation path from a voltage applying means; and
a voltage applying means comprising a gate region positioned opposite to one face of the optical phase modulation path, a source region positioned proximate to one end of another face of the optical phase modulation path, and a drain region positioned proximate to another end of another face of the optical phase modulation path, wherein the gate region transmits a part of ultraviolet excitation light, irradiated from the outside, to the optical phase modulation path,
the method comprising applying an electric voltage between the gate region, the source region, and the drain region of said modulation device, thus accumulating charges in the optical phase modulation path, while the excitation light from the outside is transmitted through the gate region and irradiated to the optical phase modulation path.

2. The drive method according to claim 1, wherein the gate region is made of a transparent electrode transmitting excitation light irradiated from the outside.

3. The drive method according to claim 1, wherein an optical path transmitting a light-wave is formed in the insulating part in parallel to the optical phase modulation path, and wherein the optical passage is optically connected to the optical phase modulation path.

4. The drive method according to claim 1, wherein the optical phase modulation path is made of poly-silicon.

5. The drive method according to claim 1, wherein the optical phase modulation path is formed using a plurality of silicon oxide films and a plurality of silicon nitride films, both of which are deposited in multiple layers.

6. The drive method according to claim 1, wherein the voltage applying means causes hot carriers so as to accumulate charges in the optical phase modulation path.

7. A drive method for switching and setting a phase of a light-wave being guided by an optical phase modulation device,
the optical phase modulation device comprising:
an optical phase modulation path having a first refractive index that is capable of being changed depending on charges accumulated therein, the optical phase modulation path having a flat cross-sectional shape perpendicular to a light-wave waveguide direction, and configured to change a phase of a light-wave;
an insulating part having a second refractive index that is lower than the first refractive index, the insulating part configured to insulate the optical phase modulation path from a voltage applying means; and
a voltage applying means comprising a gate region positioned opposite to one face of the optical phase modulation path, a source region positioned proximate to one end of another face of the optical phase modulation path, and a drain region positioned proximate to another end of another face of the optical phase modulation path, wherein the gate region transmits a part of ultraviolet excitation light, irradiated from the outside, to the optical phase modulation path,
the method comprising:
transmitting excitation light from the outside through the gate region; and irradiating said transmitted light to the optical phase modulation path, thus discharging accumulated charges.

8. The drive method according to claim 1, further comprising:
applying an electric voltage between the gate region and the source region while excitation light from the outside is transmitted through the gate region; and
irradiating said transmitted light to the optical phase modulation path, thus discharging accumulated charges.

9. The drive method according to claim 1, wherein an optical path transmitting a light-wave is formed in the insulating part in parallel to the optical phase modulation path, and wherein the optical passage is optically connected to the optical phase modulation path.

10. The drive method according to claim 7, wherein the voltage applying means causes hot carriers so as to accumulate charges in the optical phase modulation path.

11. The drive method according to claim 7, wherein the gate region is made of a transparent electrode transmitting excitation light irradiated from the outside.

12. The drive method according to claim 7, wherein an optical path transmitting a light-wave is formed in the insulating part in parallel to the optical phase modulation path, and wherein the optical passage is optically connected to the optical phase modulation path.

13. The drive method according to claim 7, wherein the optical phase modulation path is made of poly-silicon.

14. The drive method according to claim 7, wherein the optical phase modulation path is formed using a plurality of silicon oxide films and a plurality of silicon nitride films, both of which are deposited in multiple layers.

15. The drive method according to claim 7, further comprising:
applying an electric voltage between the gate region and the source region while excitation light from the outside is transmitted through the gate region; and
irradiating said transmitted light to the optical phase modulation path, thus discharging accumulated charges.

16. The drive method according to claim 7, wherein an optical path transmitting a light-wave is formed in the insulating part in parallel to the optical phase modulation path, and wherein the optical passage is optically connected to the optical phase modulation path.

* * * * *